June 10, 1958 C. R. JOHNSON 2,838,340
DEMOUNTABLE AND DISASSEMBLABLE ARMREST FOR
VEHICLE WINDOW SILLS
Filed Aug. 9, 1957

Cecil R. Johnson
INVENTOR.

BY
Attorneys

United States Patent Office 2,838,340
Patented June 10, 1958

2,838,340
DEMOUNTABLE AND DISASSEMBLABLE ARMREST FOR VEHICLE WINDOW SILLS

Cecil R. Johnson, Willoughby, Ohio

Application August 9, 1957, Serial No. 677,395

2 Claims. (Cl. 296—49.2)

The present invention relates to new and useful improvements in armrests particularly for the operators of motor vehicles and has for its primary object to provide, in a manner as hereinafter set forth, a device of this character which is adapted to be readily mounted on the upper edge of the usual vertically slidable glass in the adjacent door of the vehicle, thus providing a convenient support on which the driver may rest his arm without discomfort from heat in addition to protecting the door finish from wear, perspiration, etc.

Other objects of the invention are to provide an armrest of the character described which will be comparatively simple in construction, strong, durable, compact, of light weight, attractive in appearance and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
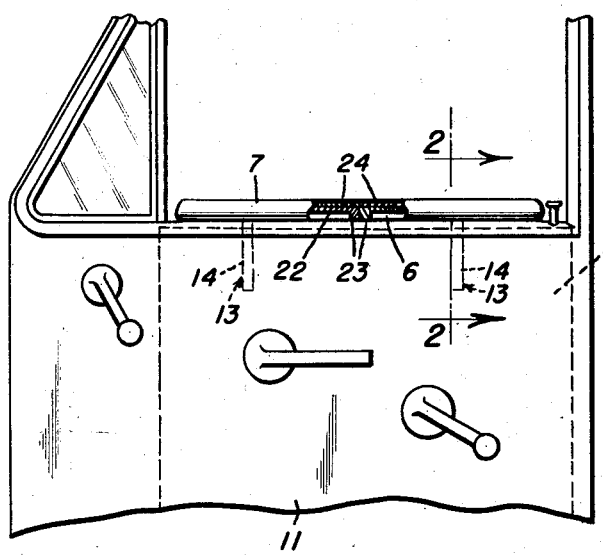
Figure 1 is a view in side elevation, partially in section, showing an armrest embodying the present invention in position in the window of an automobile door.
Figure 2:
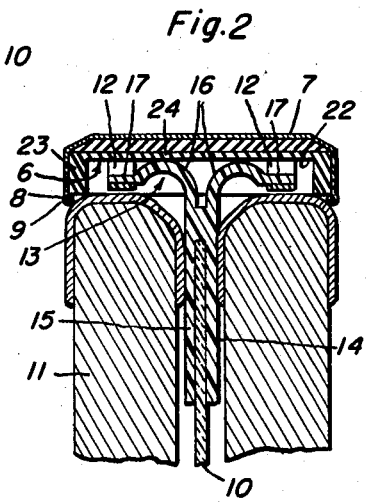
Figure 2 is an enlarged cross-sectional view, taken substantially on the line 2—2 of Figure 1.

Referring now to the drawing in detail, it will be seen that reference character 6 designates generally a substantially oval plate of plastic or other suitable material, said plate comprising a pair of duplicate, end-abutting half sections 22 having depending marginal flanges 23. The plate 6, which may be of any desired dimensions, is provided with a flexible removable cover 7. As shown to advantage in Figure 2 of the drawing, the cover 7 includes a marginal hem 8 enclosing an elastic 9 for securing said cover in position in an obvious manner. Pads 24 of sponge rubber or other suitable material are provided on the plate sections 22 beneath the cover 7.

The plate 6 is to be mounted horizontally on the upper edge of the usual vertically slidable glass 10 of any automobile door 11. Toward this end, the bottom of the plate 6 is provided, at longitudinally spaced points, with pairs of bearings 12 in the form of apertured ears or lugs. Mounted for swinging movement in the bearings 12 are substantially T-shaped brackets 13. The stems or shanks 14 of the brackets 13 are provided with slots 15 which slidably receive the upper marginal portion of the glass 10. The arms 16 of the brackets 13 are provided, on their outer ends, with trunnions 17 which are journaled in the bearings 12.

Figure 3:
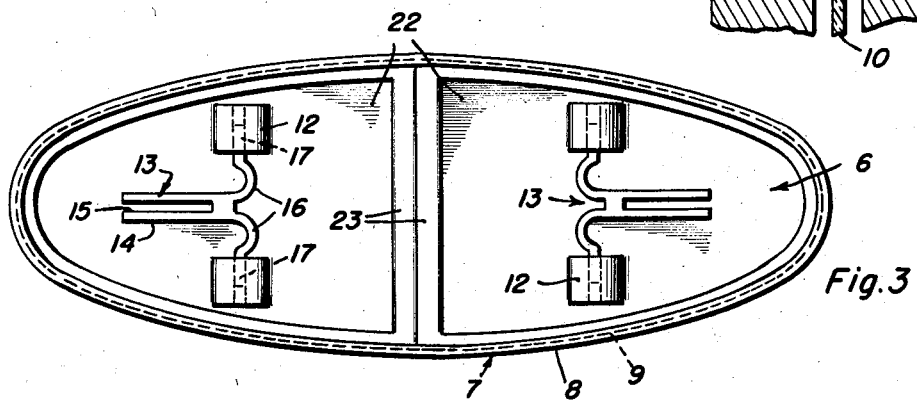
Figure 3 is a bottom plan view of the device, showing the brackets in inoperative or folded position.

It is thought that the use of the device will be readily apparent from a consideration of the foregoing. Briefly, the brackets 13 are swung to open or operative position on the plate 6 and slipped downwardly on the glass 10, said brackets straddling and frictionally gripping said glass. With the glass 10 in open or lowered position the flanges 23 rest on the adjacent portions of the door 11 in the manner shown in Figure 2 of the drawing. The construction and arrangement, it will be observed, is such as to permit the glass 10 to be raised or adjusted upwardly. Also, when desired, the device may be readily removed from the glass 10 and stored in the usual glove compartment, for example, of the vehicle after swinging the brackets 13 to inoperative or folded position (see Figure 3). The plate 6, the arms 16, etc., are sufficiently resilient to permit operation of the brackets 13 in the manner described.

Figures 4, 5:
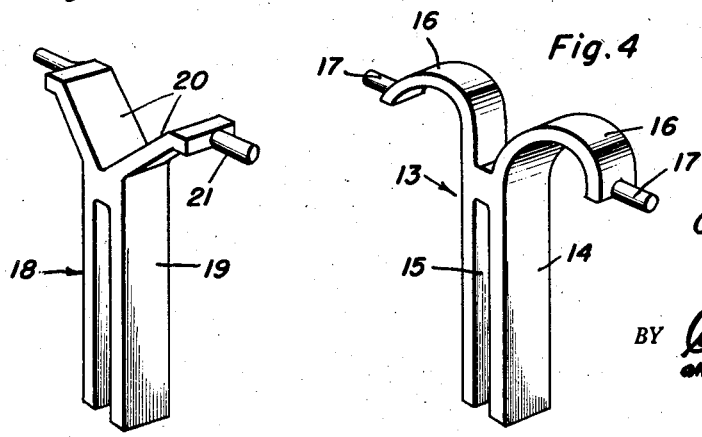
Figure 4 is an enlarged detail view in perspective of one of the brackets.
Figure 5 is an enlarged perspective view, showing a slightly modified bracket.

In the modification of Figure 5 of the drawing, reference character 18 designates generally a substantially Y-shaped bracket comprising a slotted shank or stem 19 and upwardly divergent arms 20 from the free ends of which trunnions 21 project for engagement in the bearings 12. In other respects this form of the invention is substantially similar to the embodiment illustrated in Figure 4 of the drawing.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An armrest for use on motor vehicle doors of the type including a vertically slidable glass, said armrest comprising: an elongated horizontal plate including duplicate, end-abutting separable half sections having depending marginal flanges, pads on said half sections, a flexible, removable cover on the plate securing the half sections together, and means for removably securing the plate on the upper edge of the glass.

2. An armrest for use on motor vehicle doors of the type including a vertically slidable glass, said armrest comprising: an elongated horizontal plate including duplicate, end-abutting separable half sections having depending marginal flanges, pads on said half sections, a flexible, removable cover on the plate securing the half sections together, and means for removably securing the plate on the upper edge of the glass, said means including pairs of bearings beneath the plate sections, and brackets for straddling the glass and frictionally gripping same, said brackets including trunnions journaled in the bearings for pivotally mounting said brackets on said plate sections.

References Cited in the file of this patent

UNITED STATES PATENTS

| | | |
|---|---|---|
| 1,247,547 | Eune | Nov. 20, 1917 |
| 1,873,190 | Doller | Aug. 23, 1932 |
| 1,986,935 | Levine | Jan. 8, 1935 |
| 2,633,186 | Jeckell | Mar. 31, 1953 |
| 2,697,632 | Shapiro | Dec. 21, 1954 |